(12) United States Patent
Dirscherl et al.

(10) Patent No.: US 10,649,931 B2
(45) Date of Patent: May 12, 2020

(54) DATA ENCRYPTION AND VERIFICATION BETWEEN MASTER AND SLAVE

(71) Applicant: Infineon Technologies AG, Neubiberg (DE)

(72) Inventors: Gerd Dirscherl, Munich (DE); Benedikt Driessen, Munich (DE); Gunther Fenzl, Hoehenkirchen (DE); Franz Klug, Aying (DE); Bernd Meyer, Munich (DE); Steffen Sonnekalb, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 16/258,710

(22) Filed: Jan. 28, 2019

(65) Prior Publication Data
US 2019/0243789 A1    Aug. 8, 2019

(30) Foreign Application Priority Data

Feb. 2, 2018    (DE) .......................... 10 2018 102 386

(51) Int. Cl.
*G06F 13/20*    (2006.01)
*G06F 21/60*    (2013.01)

(52) U.S. Cl.
CPC .............. *G06F 13/20* (2013.01); *G06F 21/60* (2013.01); *G06F 2213/40* (2013.01)

(58) Field of Classification Search
CPC combination set(s) only.
See application file for complete search history.

(56) References Cited

U.S. PATENT DOCUMENTS

| 2003/0084308 | A1  | 5/2003 | Van Rijnswou | |
|---|---|---|---|---|
| 2006/0288142 | A1* | 12/2006 | Beyer | G06F 13/4004 710/110 |
| 2009/0103364 | A1* | 4/2009 | Pekny | G06F 12/0246 365/185.17 |
| 2010/0138576 | A1* | 6/2010 | Goerlich | G06F 13/4291 710/110 |
| 2012/0072628 | A1* | 3/2012 | Crockett | G06F 13/4291 710/110 |
| 2013/0297829 | A1* | 11/2013 | Berenbaum | G06F 13/4256 710/3 |

OTHER PUBLICATIONS https://de.wikipedia.org//w/index.php?title=Pr%C3%BCfsumme &oldid=163908956, version of Mar. 24, 2017, 5 pages (including English maschine translation p. 3-5 ).
German Office Action based on application No. 10 2018 102 386.3 dated Dec. 12, 2018, 9 pages, for reference only.

* cited by examiner

*Primary Examiner* — Raymond N Phan
(74) *Attorney, Agent, or Firm* — Viering, Jentschura & Partner MBB (57) ABSTRACT

A method of sending data is provided. The method may include, executed in a master, applying a first code to an address of an addressed data sink of a slave, thereby forming a master-encoded address, combining the data with the master-encoded address using a reversible function, thereby forming a data-address-combination, and sending the data-address-combination and the address from the master to the slave.

19 Claims, 7 Drawing Sheets

DATA ENCRYPTION AND VERIFICATION BETWEEN MASTER AND SLAVE

CROSS-REFERENCE TO RELATED APPLICATION

This application claims priority to German Patent Application Serial No. 10 2018 102 386.3, which was filed Feb. 2, 2018, and is incorporated herein by reference in its entirety.

TECHNICAL FIELD

Various embodiments relate generally to a method of sending data, a method of receiving data, a master, a slave, and a master-slave-system.

BACKGROUND

When accessing a memory or peripheral register via an interface, e.g. a bus interface, by providing an address of a memory location or a register, the address may be manipulated by a fault attack (e.g. using a laser, a needle, etc.). In this case, a wrong memory location/register may be accessed, which may be a security risk. For example, essential data may be overwritten, critical or confidential data may be accessed, and the like.

For fault attacks in general, various countermeasures exist, e.g. detecting the attack by a sensor or by detecting the faults by redundancy.

For detecting the type of attack described above, redundant address signals may be used, for example by doubling address signals or by adding an error detection code to the address signals.

However, an effect of adding further address signals may be that additional routing may be required, which may increase production costs. Furthermore, a higher power consumption may be caused, which may increase operation costs.

SUMMARY

A method of sending data is provided. The method may include, executed in a master, applying a first code to an address of an addressed data sink of a slave, thereby forming a master-encoded address, combining the data with the master-encoded address using a reversible function, thereby forming a data-address-combination, and sending the data-address-combination and the address from the master to the slave.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Generally, a "transfer" of data is understood as a transmission of data from a sender to a receiver. Thus, data are usually sent and received during the same transfer process. Herein, the term "transferring" may be used in a case where a situation/configuration may apply to both, sending and receiving as defined in the following. Herein, sending and receiving, unless otherwise described or understood from the context, may be understood as seen from a master side of a master-slave-configuration. In other words, the sending of data may be understood as a sending of data from the master to a slave. A receiving of data may be understood as a receiving of data from the slave in the master unless stated otherwise.

Various embodiments illustratively provide a method and a corresponding master-slave mechanism, which may provide an increased security level for a data transfer by applying e.g. a block code to an address of a data sink of the slave. This generates address redundancy. The address redundancy for the data sink address of the slave generated by the master will also be referred to as master-encoded address. The data and the master-encoded address are both input to a reversible function, such as an XOR function. Illustratively, a bit-wise combination of the data with the master-encoded address may be provided. The address and the result of the reversible function are transferred from the master to the slave. Thus, the slave receives two items of information, namely the address of the data sink of the slave and the result of the reversible function. The slave, which also knows the code that the master has applied to the address of the data sink of the slave for forming the address redundancy, applies the same code, e.g. the same block code, to the received address, thereby also generating redundancy for the address, but this time on the slave side. The address redundancy for the data sink address of the slave generated by the slave, will also be referred to as slave-encoded address. This slave-encoded address and the received result of the reversible function will be input to the reversible function (e.g. an XOR) again. Illustratively, a bit-wise combination of the received result of the reversible function with the slave-encoded address may be provided. Assuming the master-encoded address and the slave-encoded address are identical, the result of the slave-side application of the reversible function will be the re-constructed data.

The using of the redundancy information for the address of the data sink of the slave already on the master side and as an input to the reversible function increases the security level of the entire mechanism.

In other words, to avoid an overhead caused by additional signals for the address redundancy (e.g., a doubling of the address and/or an error detection code (EDC)), the address redundancy of an accessed data sink (e.g. a special function register (SFR), a memory location, or a flip-flop array, e.g. a latch) may be combined with data of the access in a reversible way (e.g. using a reversible function) and transferred (i.e., sent or received) via an interface (e.g. a parallel interface, e.g. a data bus). One of the simplest reversible functions is a binary (bit-wise) adding of the address redundancy to the data (i.e., applying an XOR function).

In this context, "combining" may be understood to mean combining of individual data bits of a data word with individual bits of the address redundancy (e.g., using the XOR function), rather than a concatenating of the data word with the address redundancy.

Since the data may, of course, also be manipulated, an integrity protection mechanism for the data, for example using an EDC, may typically be in place. In various embodiments, the integrity protection mechanism may be used for protecting also the address of the access.

A number of bits of the address redundancy may be lower than or at most equal to a number of data bits.

Thus, a protection of a data sink address (e.g., of a memory or a register) may be provided by using implicit data protection mechanisms without an overhead on an interface (e.g., a bus), as described above. For example, a standard interface, e.g. a standard bus may be used (e.g., without proprietary extensions), and/or protected and unprotected transfers may be realized using the same (e.g. standard) interface, e.g. standard bus.

In various embodiments, a method of protecting an address space of a data sink (e.g., of a memory module) by an address dependent modification of transferred (i.e. sent/received) data is provided.

Figure 1:
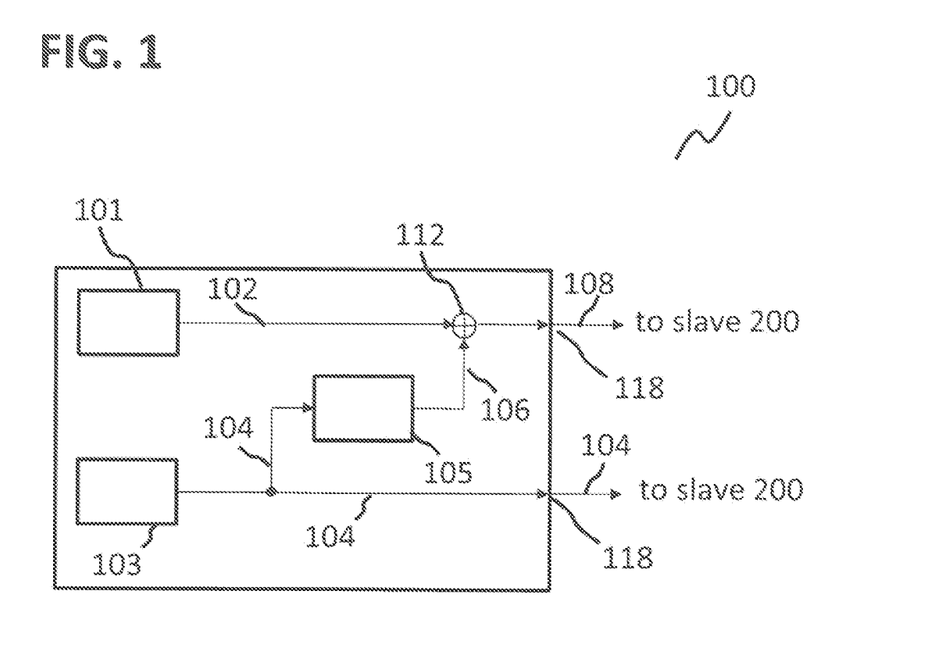
FIG. 1 shows a schematic view of a master used for sending data in accordance with various embodiments.
Figure 2:
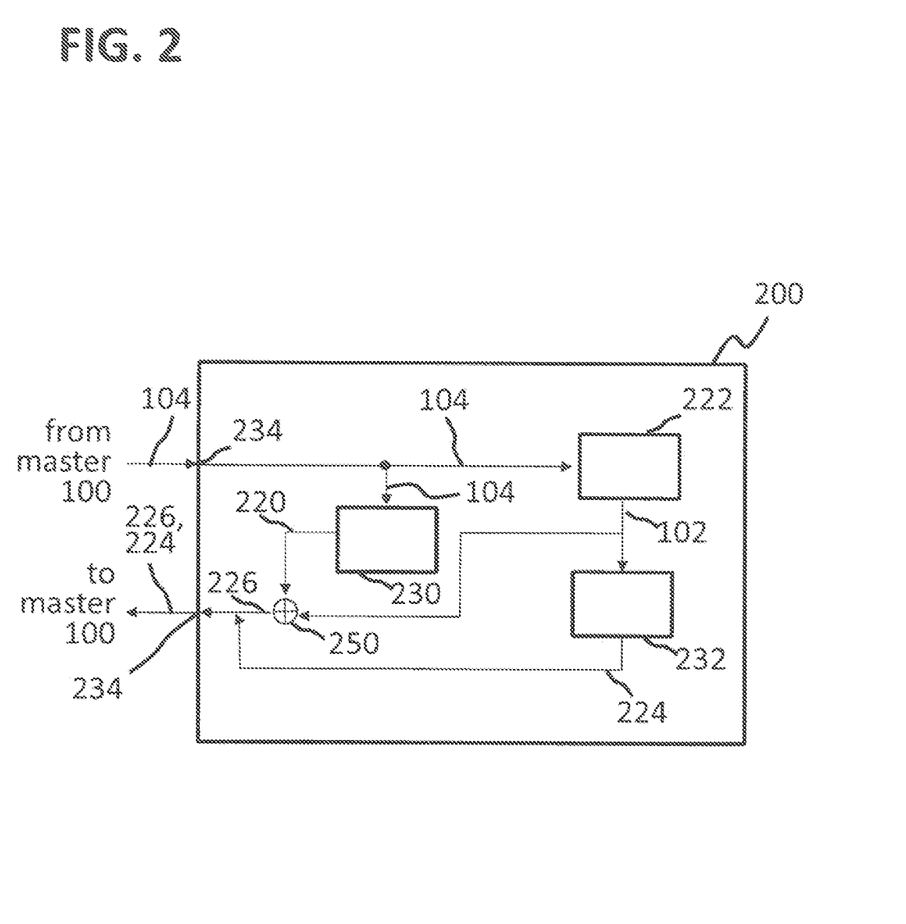
FIG. 2 shows a schematic view of a slave for processing data from a data sink in accordance with various embodiments.
Figure 3A:
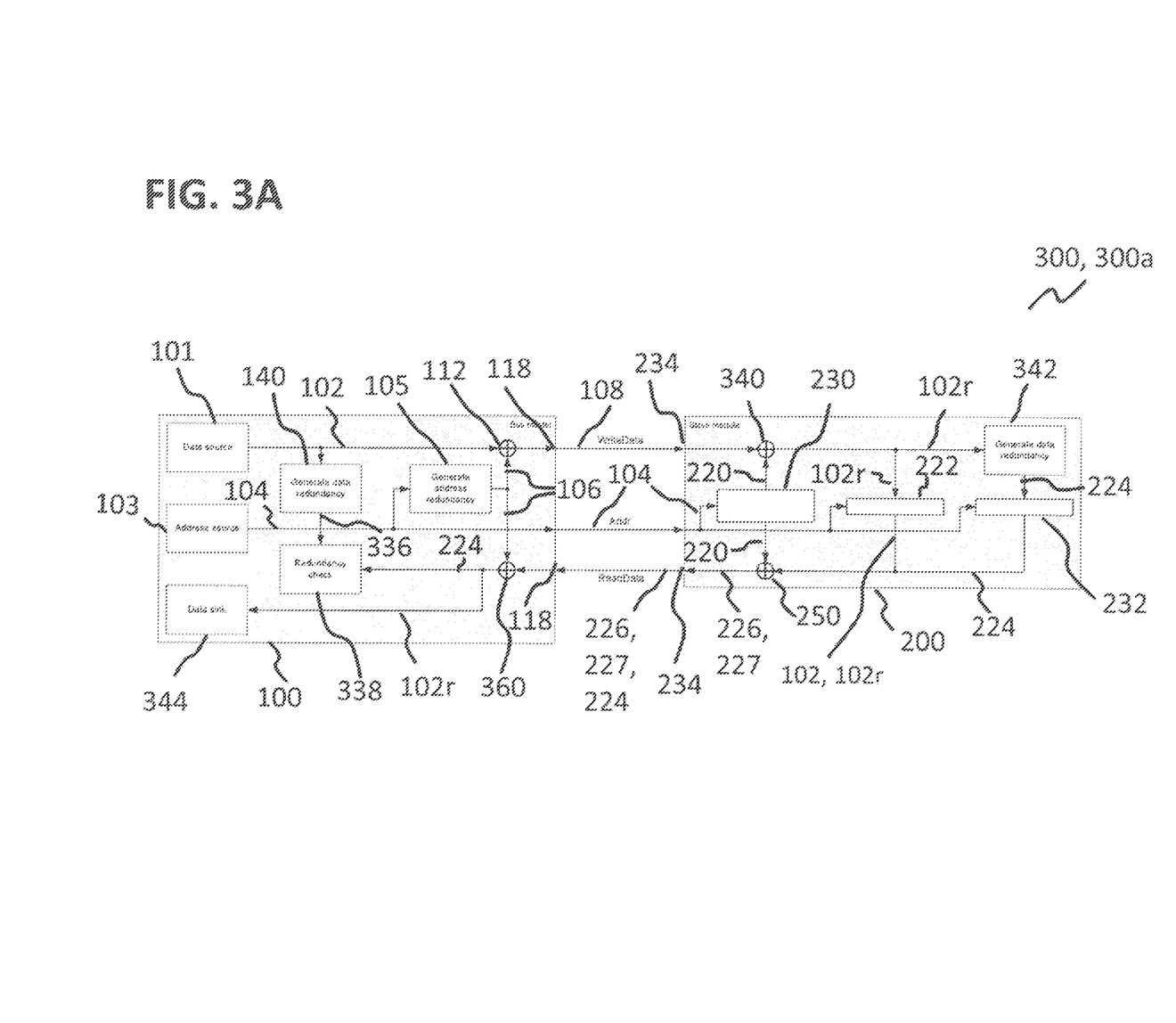
FIG. 3A and FIG. 3B each show a schematic view of a master-slave-system in accordance with various embodiments including the master of FIG. 1 and the slave of FIG. 2 used for transferring data between the master and the slave in accordance with various embodiments.
Figure 3B:
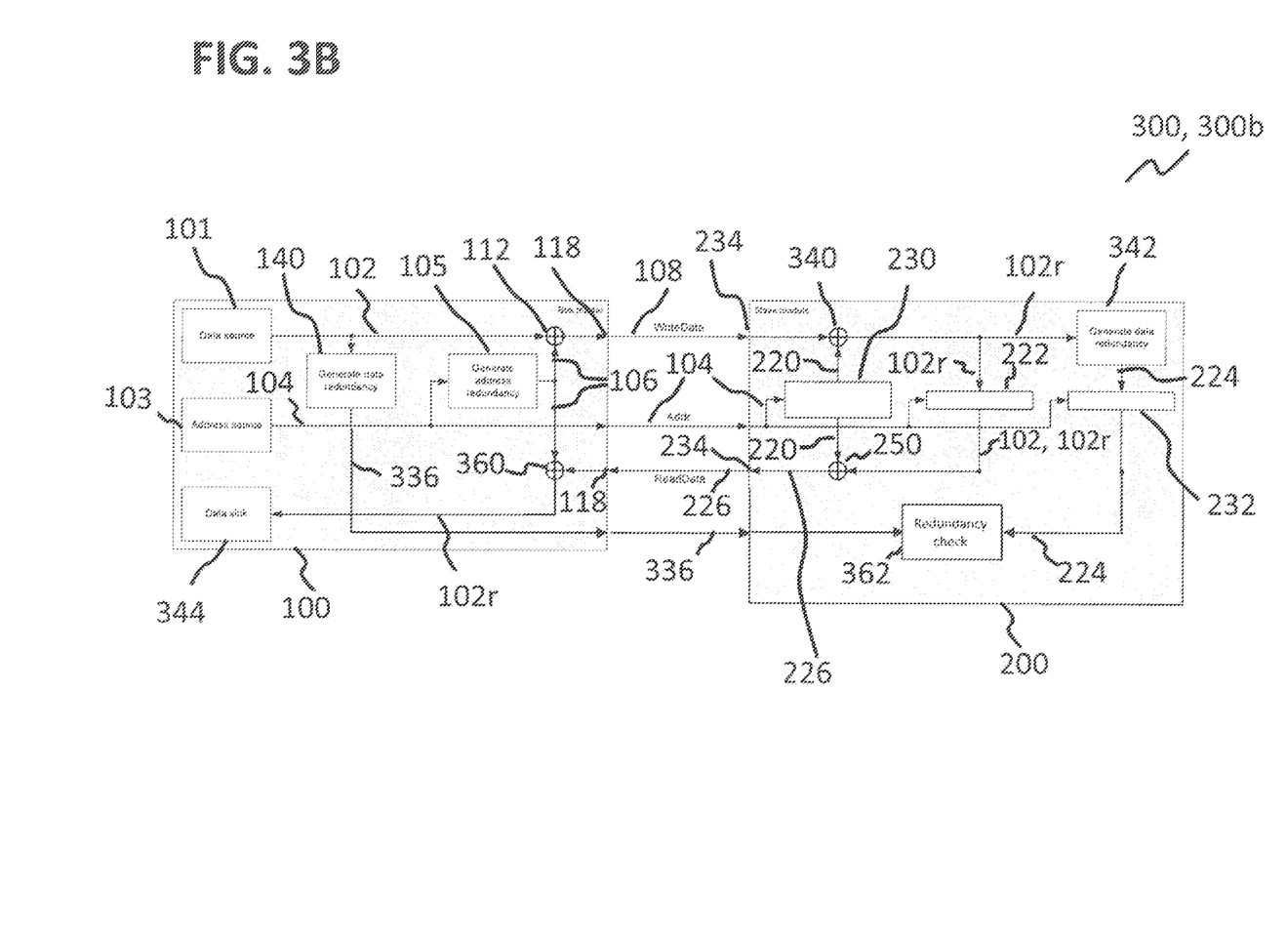
Figure 4:
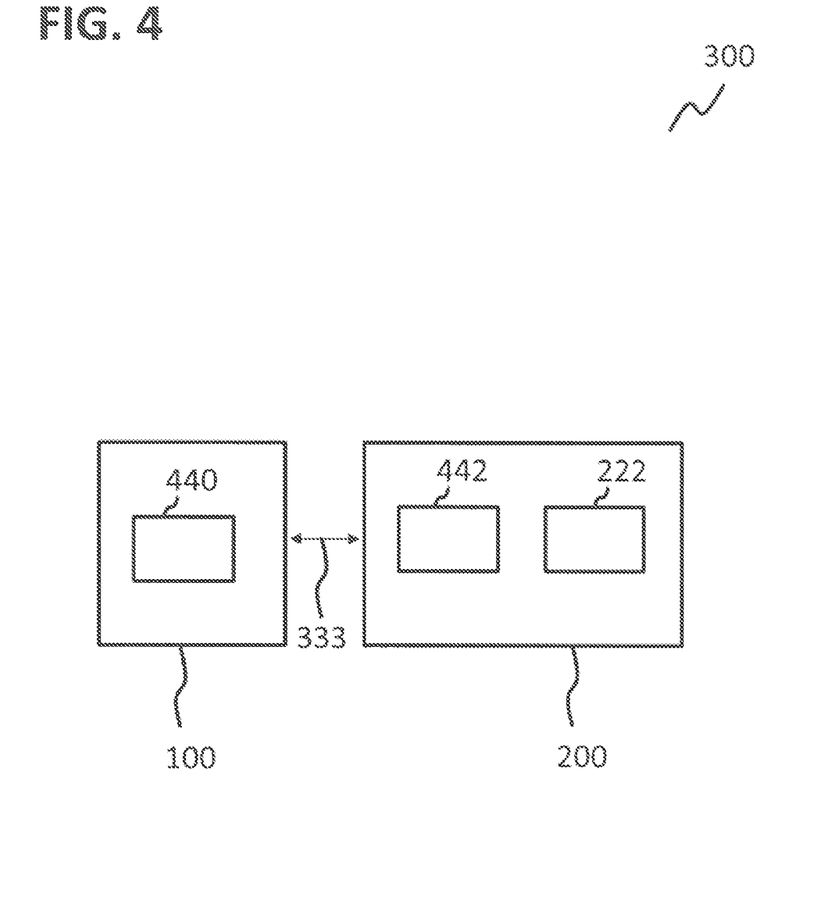
FIG. 4 shows a schematic view of the master-slave-system of FIG. 3A in accordance with various embodiments.

FIG. 1 shows a schematic view of a master 100, also referred to as bus master 100, used for sending data. FIG. 2 shows a schematic view of a slave 200, components of which are used for processing data from a data sink 222 included in the slave 200. Each of FIG. 3A and FIG. 3B shows a schematic view of a master-slave-system 300 (FIG. 3A: 300a, FIG. 3B: 300b) in accordance with various embodiments including the master 100 of FIG. 1 and the slave 200 of FIG. 2. FIG. 4 shows a schematic view of the master-slave-system 300 of FIG. 3A and FIG. 3B, respectively.

For easier understanding, the description is split up into eight cases.

The master 100, e.g. a bus master 100, may include a data source 101 configured to provide data 102 that should be transferred to the slave 200 and should be stored in the data sink 222 (e.g. a memory location) within the slave 200 (see FIG. 2, FIG. 3A, FIG. 3B and/or FIG. 4), using a protection mechanism that will be described in more detail below.

As shown for example in FIG. 4, the master 100 may, in various embodiments, be an electronic device having a processor 440, also referred to as the master processor 440. The master 100 may be a secure environment such as a Trusted Platform Module (TPM). The master 100 may be or include a controller configured to control the slave 200, for example a memory controller, register controller, or the like. The master processor 440 may implement the controller.

Furthermore, the master 100 may include an address generator 103 configured to generate an address 104 of the data sink 222 of the slave 200, specifying in which addressed location of the data sink 222 the master 100 wants to store the data 102.

The addressed data sink 222 may be a storage space 222. The storage space 222 may include one or more memories, each including one or more memory cells. The one or more memories may include memories of the same type or of different types such as volatile and/or non-volatile memories, and the like. A possible purpose of sending the data 102 to the storage space may be or include storing the data 102 in the storage space 222.

The master 100 may further include a redundancy generating circuit 105 configured to generate redundancy to input bits using e.g. a block code, e.g. a linear code, e.g. a Hamming code or a cyclic code or the same. An input of the redundancy generating circuit 105 is coupled to an output of the address generator 103, so that the address 104 may be supplied to the redundancy generating circuit 105 by the address generator 103. The redundancy generating circuit 105 may execute the respectively implemented function on (e.g. apply a first code to) the supplied address 104 to generate the redundancy for the address 104. This redundancy will also be referred to as master-encoded address 106 in the following.

In more detail, as shown in FIG. 3A, FIG. 3B and FIG. 4, the master-slave-system 300 may include the master 100 and the slave 200, and an interface 333 connecting the master 100 and the slave 200. The interface 333 may for example be or include a bus, for example a parallel bus, for example a bus in accordance with advanced microcontroller bus architecture (AMBA) specifications, for example a bus having a bus width of 32 bit, an advanced high-performance bus (AHB) having a bus width of for example 64 or 128 bit, an advanced peripheral bus (APB), or any other suitable parallel bus, for example a flexible peripheral interface (FPI) bus, a parallel flash bus, or the like. In other words, the interface 333 may be implemented as a serial interface and/or as a parallel interface, allowing a serial and/or a parallel transfer of data, respectively. The interface 333 may connect one or more input/output ports 118 of the master 100 to one or more input/output ports 234 of the slave 200, for example as pairwise connections.

The master 100 may further include a processing unit, also referred to as a function processor 112. The function processor 112 may be configured to combine the data 102 with the master-encoded address 106 using a reversible function (e.g., a linear function, e.g. an XOR function), thereby forming a data-address-combination 108. In other words, the function processor 112 may implement a reversible function (e.g., a linear function, e.g. an XOR function), and thus may e.g. be a logic XOR gate.

The master-slave-system 300 may, in various embodiments, allow a secure data transfer from the master 100 to the slave 200.

For storing the (unencoded, uncombined) data 102, which have been transferred from the master 100 to the slave 200 encoded as part of the data-address-combination 108, the data 102 may be reconstructed (then also referred to as reconstructed data 102r) from the data-address-combination in the slave 200.

As shown in FIG. 3A and FIG. 3B, the slave 200 may include an address redundancy generator 230 (for distinction from the address redundancy generator 105 of the master 100 also referred to as further address redundancy generator 230) configured to form the slave-encoded address 220. The further address redundancy generator 230 may be a circuit element that may be hardwired to form the slave-encoded address 220 in a predefined way.

This means that the further address redundancy generator 230 may in various embodiments be a hardwired logic configured to determine the address redundancy 220 of the address 104. In an alternative configuration, the further address redundancy generator 230 may be configurable to form the slave-encoded address 220 in one of various ways.

For reconstructing the data, i.e. for applying the reverse function to the function used for combining the data, the slave 200 may include the further function processor 340 (e.g. an XOR gate). The slave 200 is configured to supply the received data-address-combination 108 to a first input of the further function processor 340 and the address redundancy 220 to a second input of the further function processor 340. The further function processor 340 is configured to apply the respectively implemented reversible function (e.g. bit-wise logic XOR) to the input data items and to thus determine the reconstructed data 102r.

The reconstructed data 102r may be stored in the addressed data sink 222.

In various embodiments, the address 104 of the data sink 222 may be a constant, and therefore also the address redundancy 220 may be a constant. Therefore, it may not be necessary to calculate the address redundancy 220 from the address 104. In various embodiments, an XORing the data 102 with the address redundancy 220 may be implemented by some inverters when storing in or reading from the data sink 222, thereby determining the storage location in a hard-wired and thus very fast and cheap manner.

The master-slave-system 300 may allow for a verification of data and address integrity in the master 100. For this, the master 100 may be provided with an integrity check circuit 338, also referred to as redundancy check circuit 338.

The integrity check circuit 338 may be provided with two inputs for being compared with each other.

In the present case of the master 100 having sent the data 102 to the slave 200, as for example shown in FIG. 1 and FIG. 3A, a first input to the integrity check circuit 338 (see FIG. 3A) may be master-encoded data 336 generated by a data redundancy generating circuit 140 in the master 100, which may be configured to apply a third code to the data 102, thereby forming the master-encoded data 336. Slave-encoded data 224 (also referred to as slave-encoded stored data 224, since the reconstructed data 102r corresponding to those stored in the addressed data sink 222 are used) may be generated in the slave 200 by a data redundancy generating circuit 342, which may be configured to apply the third code to the reconstructed data 102r, thereby forming the slave-encoded stored data 224. The slave-encoded data may form a second input to the integrity check circuit 338. The slave-encoded stored data 224 may be transferred to the master 100 directly by the input/output ports 234, similar to what is shown in FIG. 2.

A relation of the address 104 of the data sink 222 and a related address of the data redundancy 224 (labelled in FIG. 3A and FIG. 3B as 232) may for example be a constant offset, which may be written as a'=a+c, with a being the address 104, a' being the related address of the data redundancy 224, and c being the constant offset.

Alternatively, slave-encoded stored data 224 may be transferred to the master 100 after having been combined with the address redundancy 220 in the yet further function processor 250, whereby a slave-encoded-data-address-combination 227 may be formed.

As for example shown in FIG. 3A for the master-slave-system 300a, the slave 200 may include the yet further function processor 250 (e.g. an XOR gate), wherein the slave 200 supplies the slave-encoded stored data 224 (i.e. the redundancy generated by the data redundancy generator 342) to a first input of the yet further function processor 250 and the address redundancy 220 to a second input of the yet further function processor 250. The yet further function processor 250 applies the respectively implemented reversible function (e.g. bit-wise logic XOR) to the input data items and determines the resulting slave-encoded-data-address-combination 227.

The master 100 may further include another function processor 360, which may for example be used in a case of the slave-encoded-data-address-combination 227 being provided for the integrity check. The other function processor 360 may be configured to receive the slave-encoded-data-address-combination 227, restore the slave-encoded stored data 224 from the slave-encoded-data-address-combination 227, and provide the slave-encoded stored data 224 to the integrity check circuit 338 as the second input for the integrity check (see FIG. 3A).

The master 100 may be configured to trigger an alarm in a case of the comparison of the master-encoded data 336 to the slave-encoded stored data 224 resulting in a mismatch, which may be indicative of a compromised address 104 and/or compromised data 102.

The master-slave-system 300 may allow for a verification of an integrity of the stored data and the address at which the data are stored in the slave 200. This is shown in FIG. 3B for an exemplary master-slave-system 300b.

The slave 200 may include an integrity check circuit 362, which is also referred to as further integrity check circuit 362 for easier distinction from the integrity check circuit 338 of the master 100. A functionality of the further integrity check circuit 362 may be similar or identical to that of the integrity check circuit 338.

As a first input to the further integrity check circuit 362, slave-encoded stored data 224 may be provided, which may be generated in the slave 200 by the data redundancy generating circuit 342, which may be configured to apply a second code to the reconstructed data 102r, thereby forming the slave-encoded stored data 224.

As a second input to the further integrity check circuit 362, master-encoded data 336 generated by the data redundancy generating circuit 140 in the master 100 may be provided, wherein the data redundancy generating circuit 140 may be configured to apply the second code to the data 102, thereby forming the master-encoded data 336.

In various embodiments, in a case of the data 102 and the address 104 being uncompromised, the master-encoded address 106 and the slave-encoded address 220 may be identical, and the master-encoded data 336 and the slave-encoded stored data 224 may be identical.

The slave 200 may be configured to trigger an alarm in a case of the comparison of the master-encoded data 336 to the slave-encoded stored data 224 resulting in a mismatch, which may be indicative of a compromised address 104 and/or compromised data 102.

In the following, the slave 200 and its functionality with respect to the storing of data will be described in more detail. The slave 200 may, in various embodiments, as for example shown in FIG. 2 and/or in FIG. 4, be an electronic device having a further processor 442, which may (for facilitating a distinction from the master processor 440) be referred to as the slave-processor 442. The slave 200 may include an addressable data sink 222. The data sink 222 may for example be or include a special function register (SFR), a memory location, or a flip-flop array, e.g. a latch. The slave 200 may for example be or include any device for which it is essential that an integrity of the data provided by it can be relied upon, for example a cryptographic unit like an advanced encryption standard (AES) accelerator, or for example, in the present case of reading the data from the slave 200, a random number generator.

The master-slave-system 300 may allow an integrity protected data transfer from the slave 200 to the master 100.

As shown in FIG. 2, the slave 200 may include one or more input/output ports 234, by which the address 104 of the addressed data sink 222 may be provided from the master 100.

The further address redundancy generator 230 described above may be used for applying a fourth code to the address 104, thereby forming a slave-encoded address 220.

The data 102 may be read from the addressed data sink 222.

The slave 200 may further include the yet further function processor 250. The yet further function processor 250 may be similar to the function processor 112 and configured to combine the read data 102 with the slave-encoded address 220 using a reversible function, thereby forming a data-address-combination 226, and to send the data-address-combination 226 to the master 100, for example via the one or more input/output ports 234 of the slave 200.

The master 100 may further include input/output ports 118 (in FIG. 1, only an output functionality of the input/output ports 118 is shown, but see e.g. FIG. 3A and FIG. 3B) by which the data-address-combination 226 may be received in the master 100.

The redundancy generating circuit 105 described above may further be configured to apply the fourth code to the address 104, thereby forming a master-encoded address 106.

The master 100 may further include the other function processor 360, which may be configured to reconstruct the data from the received data-address-combination 226 by reversing the function using the master-encoded address 106, thereby forming reconstructed data 102r.

In other words, the master 100 may receive the data 102 and the address 104 (that the master 100 originally provided to the slave 200) from the slave 200 as a data-address-combination 226, which may be generated in the slave 200, wherein the slave 200 may be a secure environment.

For allowing an integrity check of the received data, slave-encoded data 224 may additionally be generated in the slave 200 and provided to the master 100, and the master may be configured to compare the reconstructed data 102r with the slave-encoded data 224.

In the present case of the master 100 having received the data 102 from the slave 200, there may not be any data 102 originally present in the master 100 that could be used for the integrity check. Instead, both inputs to the integrity check circuit 338 may include the data 102 provided by the slave 200, in the form of the data-address-combination 226 and of the slave-encoded data 224.

The data redundancy generator 342 in the slave 200 may be configured to apply a fifth code to the read data 102, thereby forming slave-encoded data 224. The slave-encoded data 224 may be provided as a first input to the integrity check circuit 338 as described above for the integrity check of the send-data case. For providing the second input, reconstructed data 102r may be reconstructed from the received data-address-combination 226 by the other function processor 360 using the address 104 and encoded, by the data redundancy generating circuit 140, to form master-encoded data 336.

The integrity check circuit 338 may be configured to compare the slave-encoded data 224 and the master-encoded data 336 with each other, which are supposed to be identical in a case of the data 102 retrieved from the slave 200 and the address provided to the slave 102 being uncompromised.

In various embodiments, in a case of the data 102 and the address 104 being uncompromised, the master-encoded address 106 and the slave-encoded address 220 may be identical, and the master-encoded data 336 and the slave-encoded stored data 224 may be identical.

The master 100 may be configured to trigger an alarm in a case of the comparison of the master-encoded data 336 to the slave-encoded stored data 224 resulting in a mismatch, which may be indicative of a compromised address 104 and/or compromised data 102.

The master-slave-system 300 may allow for a verification of data and address integrity in the slave 200.

The further integrity check circuit 362 may be configured to perform the integrity check in the slave 200.

As a first input to the further integrity check circuit 362, slave-encoded data 224 may be provided, which may be generated in the slave 200 by the data redundancy generating circuit 342, which may be configured to apply a code (e.g. the second code) to the data 102 transferred to the master 100, thereby forming the slave-encoded stored data 224.

As a second input to the further integrity check circuit 362, master-encoded data 336 generated by the data redundancy generating circuit 140 in the master 100 may be provided. In contrast to what is shown in FIG. 3B, the data redundancy generating circuit 140 may in this case be configured to apply the code (e.g. the second code) to the reconstructed data 102r that were retrieved from the slave 200, thereby forming the master-encoded data 336, which may therefore also be referred to as master-encoded reconstructed data 336.

In various embodiments, in a case of the data 102 and the address 104 being uncompromised, the master-encoded address 106 and the slave-encoded address 220 may be identical, and the master-encoded reconstructed data 336 and the slave-encoded data 224 may be identical.

The slave 200 may be configured to trigger an alarm in a case of the comparison of the master-encoded data 336 to the slave-encoded data 224 resulting in a mismatch, which may be indicative of a compromised address 104 and/or compromised data 102.

The method of sending data 102 may include, in the master 100, applying the first code to the address 104 of the addressed data sink 222 of the slave 200 (see e.g. FIG. 3A), thereby forming a master-encoded address 106. The redundancy generating circuit 105 may be used for this process. The redundancy of the address 104 may, in various embodiments, be calculated in a secure manner in the secure environment of the master 100.

The method of sending data may further include combining (at the function processor 112) the data 102 with the master-encoded address 106 using a reversible function (e.g., a linear function, e.g. an XOR function), thereby forming a data-address-combination 108. In other words, the function processor 112 may implement a reversible function (e.g., a linear function, e.g. an XOR function), and thus may e.g. be a logic XOR gate.

The method may further include sending, for example using one or more input/output ports 118 of the master, the data-address-combination 108 from the master 100 to the slave 200, and sending the address 104 from the master 100 to the slave 200. The data-address-combination 108 and the address 104 may be sent sequentially or in parallel.

In various embodiments, as shown in FIG. 3A, the method of sending data 102 may further include, in the slave 200, applying the first code to the address 104 received from the master 100, thereby forming a slave-encoded address 220. The further address redundancy generator 230 may be used for this.

The method may further include, e.g. at the further function processor 340 in the slave 200, reconstructing the data 102 (the reconstructed version of the data is also referred to as 102*r*) from the data-address-combination 108 by reversing the reversible function using the slave-encoded address 220, and storing the reconstructed data 102*r* in the addressed data sink 222 (see FIG. 3A and FIG. 3B). The reversing the reversible function may be implemented by the function processor 340.

In other words, in the method of sending data, the master 100 may send the data 102 and the address 104 to the slave 200 as a data-address-combination 108, which may be generated in the master 100, and as the plain address 104.

In various embodiments, as shown in FIG. 3A, the method of sending data 102 may further include, in the slave 200, applying the first code to the address 104 received from the master 100, thereby forming a slave-encoded address 220, also referred to as address redundancy 220.

In an illustrative example, as shown in FIG. 3A, the slave 200 may include the addressed (by address 104 in FIG. 3A) data sink 222, e.g. a special function register (SFR) for storing the data 102. For writing to the data sink 222 at the address 104, the slave-encoded address 220 (also referred to as address redundancy), which may for example be parity bits providing a hamming distance n code of the address 104, may be combined with (e.g., XORed to) the data-address-combination 108 to reconstruct the data to be stored 102*r*.

In a case of the reversible function being the XOR function, the address redundancy 220 may be removed by (bit-wise) XORing the redundancy 220 of the address computed from the address 104 with the received data (the data-address-combination 108), since the XOR function is its own reverse function. The result, which in a case of uncompromised data and address, are the data 102, may be sent back to the master 100 for an integrity check (see below).

Figure 5:
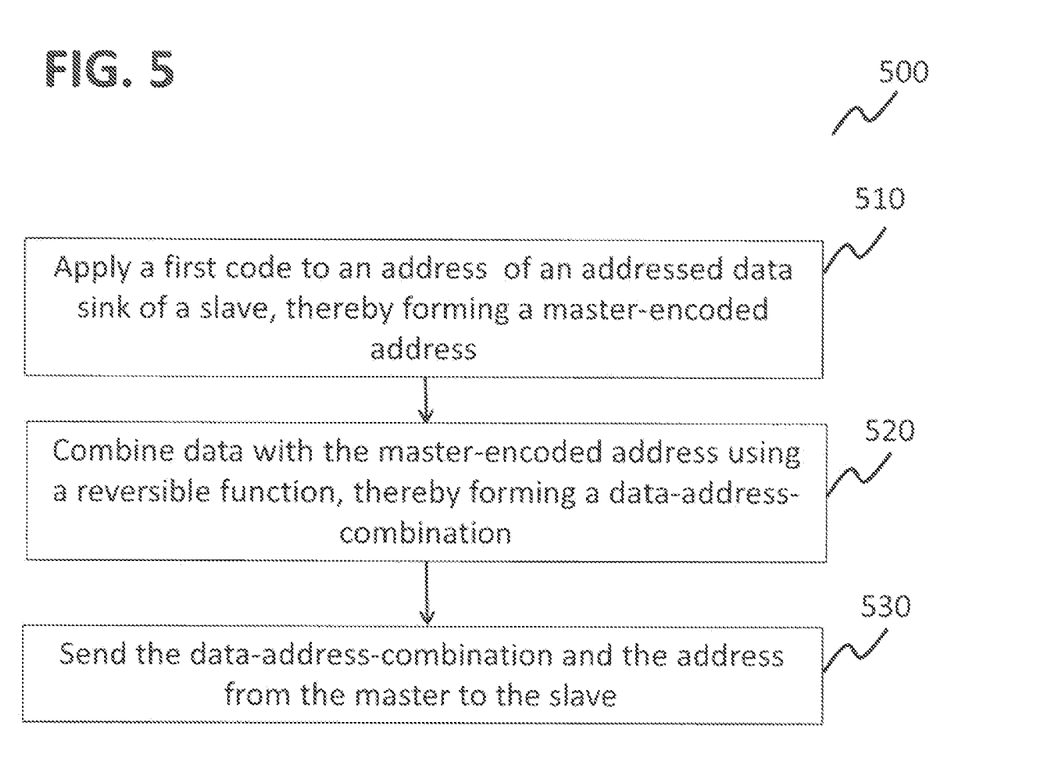
FIG. 5 shows a process flow for a method of sending data according to various embodiments.

FIG. 5 shows a process flow 500 for a method of sending data according to various embodiments.

The method of sending data may include, in the master, applying a first code to an address of an addressed data sink of a slave, thereby forming a master-encoded address (in 510), combining the data with the master-encoded address using a reversible function, thereby forming a data-address-combination (in 520), and sending the data-address-combination and the address from the master to the slave (in 530).

In various embodiments, the sending the data-address-combination and the address from the master to the slave may be executed sequentially.

In various embodiments, the sending the data-address-combination and the address from the master to the slave may be executed in parallel, for example using a parallel interface between the mater and the slave.

An integrity check may allow to test whether an integrity of the data sent to the slave 200 and/or of the address has been compromised.

In various embodiments, an integrity check of the data 102 may be done in the master 100.

The method of sending data may include applying the third code to the data 102 (using the data redundancy generating circuit 140), thereby forming the master-encoded data 336, which may be used as a first input of the integrity check circuit 338.

Furthermore, the method of sending data may include, in the slave 200, e.g. using the data redundancy generating circuit 342, applying the third code to the reconstructed data 102*r*, thereby forming the slave-encoded data 224, also referred to as slave-encoded stored data 224, e.g. as described above in section 1.1.1. The slave-encoded stored data 224 may be sent to the master 100 and provided to the integrity check circuit 338, e.g. as described above in section 1.1.1., for example directly as the slave-encoded data 224 or by transferring the slave-encoded data 224 as the slave-encoded-data-address-combination 227 as described above and reconstructing the slave-encoded stored data 224 in the master 100. The master 100 may thus receive the slave-encoded stored data 224 from the slave 200 as a second input of the integrity check circuit 338.

The master 100 may verify the integrity of the stored data 102 by comparing the master-encoded (stored) data 336 to the slave-encoded stored data 224, for example using the redundancy check circuit 338, as shown in FIG. 3A.

In the illustrative example of FIG. 3A, the slave-encoded data 224 may be read from the slave 200 via an address that may be a related address to the address used for storing the data 102, and the master 100 may check (using the redundancy check circuit 338) if the slave-encoded data 224 fit to the data 102 (or the master-encoded data 336, respectively). If either the data 102 or the address 104 or both are manipulated during the bus transfer, the manipulation will be detected with high probability (depending on the code properties of the first code applied to the address 104 for generating the address redundancy (i.e. the master-encoded address 106 and/or the slave-encoded address) 220 and the second code applied to the data 102 for generating the data redundancy (i.e., the master-encoded data 336 and/or the slave-encoded data) 224).

The slave-encoded data 224 may either be sent from the slave 200 to the master 100 in parallel to the encoded data (the data-address-combination 226) and/or serially.

The integrity check may, alternatively or in addition to the integrity check in the master 100, be performed in the slave 200.

In various embodiments, the method of sending data may further include, in the master 100, applying a code, e.g. the second code, to the data 102, thereby forming the master-encoded data 336. For this, the data redundancy generating circuit 140 may be used.

Furthermore, the master 100 may send the master-encoded data 336 from the master 100 to the slave 200, for example via the one or more input/output ports 118 being part of the interface 333.

The slave 200 may verify an integrity of the stored data 102. Therefore, the method may further include applying the same code as used for creating the master-encoded data, e.g. the second code, to the stored data 102, thereby forming slave-encoded (stored) data 224, e.g. using the further data redundancy generating circuit 342.

The first code for forming the master-encoded address 106 may be identical to the first code for forming the slave-encoded address 220. The second code for forming the master-encoded data 336 may be identical to the second code for forming the slave-encoded stored data 224.

The verifying the integrity of the stored data 102 may further include comparing the master encoded data 336 to the slave-encoded (stored) data 224 in the slave 200, e.g. using the further integrity check circuit 362, as for example shown in FIG. 3B. In other words, the slave module 200 may check/verify whether the master-encoded data 336 fits to the data 102, for example by comparing the master-encoded data 336 to the slave-encoded stored data 224.

In the embodiment of FIG. 3B, the master-encoded data 336 (which may be generated in a secure manner in the master 100) may be sent simultaneously to the data-address-combination 108 or sequentially to the data-address-combination 108 (in other words, the master-encoded data 336 may be sent via a second transfer before or after the data-address-combination 108) to the related address in the slave module 200.

In various embodiments, the method of sending data may further include, in a case of the comparing the master-encoded data 336 to the slave-encoded stored data 224 using the integrity check circuit 362 resulting in a mismatch, triggering (in other words, raising) an alarm.

In various embodiments, a read access to the slave 200 may work analogously to the write access described above.

As shown in FIG. 2, the method of processing data from the data sink 222 may, in various embodiments, include, in the slave 200, receiving the address 104 of the addressed data sink 222 from the master 100, for example by one or more input/output ports 234 of the slave 200, reading data 102 from the addressed data sink 222, and applying the fourth code to the address 104, thereby forming a slave-encoded address 220. The further address redundancy generator 230 may be used for this.

The method of processing data may further include (e.g. provided by the yet further function processor 250), combining the read data 102 with the slave-encoded address 220 using a reversible function, thereby forming a data-address-combination 226, and sending the data-address-combination 226 to the master 100, for example via the one or more input/output ports 234 of the slave 200.

In FIG. 3A, in the example of the method of processing data from the data sink 222, the data 102 of the data sink 222 addressed by the address 104 and the slave-encoded address 220 may be combined using the reversible function, e.g. XOR. The resulting data-address-combination 226 may be sent from the slave 200 to the master 100 via the interface 333, e.g. the bus. On the bus master 100 side, the address redundancy 106 may be combined with (e.g. XORed to) the data-address-combination 226 received from the interface 333 (e.g. the bus), thereby forming restored data 102r. An integrity check of the restored data 102r may be performed as described below.

In other words, in the method of processing data, the master 100 may request data from an address 104 and receive the data 102 and the address 104 from the slave 200 as a data-address-combination 226 that may be generated in the slave 200, wherein the slave 200 may be a secure environment.

In various embodiments, a manipulation of either the address 104, or the data 102 and/or the data-address-combination 226 may be detected with high probability. If a check (e.g. as described below) is passed, in other words, an integrity of the data 102 and the address 104 are verified, the data 102 may be processed further or stored in a data sink 344, e.g. a register 344, in the bus master 100.

Figure 6:
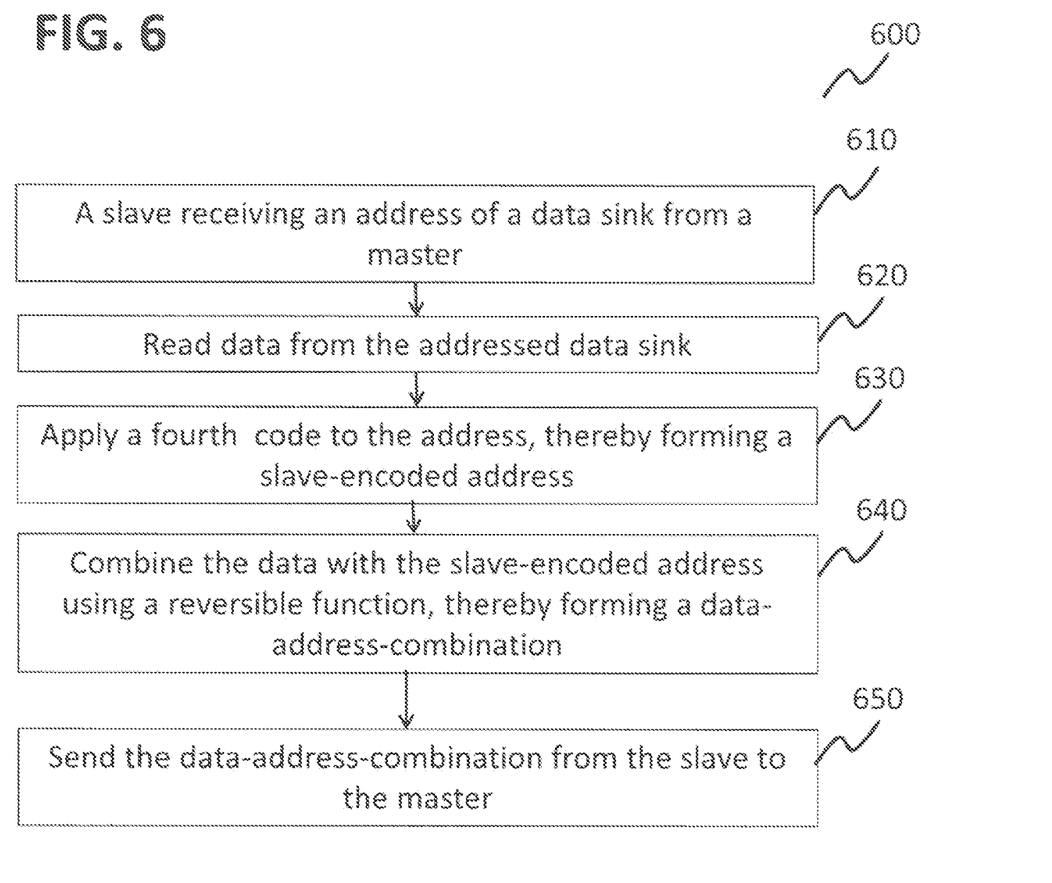
FIG. 6 shows a process flow for a method of processing data from a data sink according to various embodiments.

FIG. 6 shows a process flow 600 for a method of processing data according to various embodiments.

The method of processing data may include, in the slave, receiving an address of an addressed data sink from a master (in 610), reading data from the addressed data sink (in 620), applying a fourth code to the address, thereby forming a slave-encoded address (in 630), combining the data with the slave-encoded address using a reversible function, thereby forming a data-address-combination (in 640), and sending the data-address-combination from the slave to the master (in 650).

In the present case of the master 100 having restored the data from the data-address-combination 226 received from the slave 200, thereby forming reconstructed data 102r, the method of processing data may include applying a code to the read data 102 (using the data redundancy generating circuit 342 of the slave 200), thereby forming slave-encoded data 224. The code may for example be the fifth code, which may be different from or identical to the second code (as long as it is ensured that the fifth code is also applied to the reconstructed data 102r in the master 100 to form the master-encoded data 336 to be compared with the slave-encoded data 224). The slave-encoded data 224 may be provided, e.g. by sending them to the master 100, as a first input to the integrity check circuit 338 as described above for the integrity check of the send-data case.

The method of processing data may further include reconstructing the data (thereby forming the reconstructed data 102r) from the received data-address-combination 226 using the address 104, e.g. using the other function processor 360. To achieve this, the method of processing data may further include, in the master 100, applying the fourth code to the address 104, thereby forming a master-encoded address 106, and reconstructing the data from the received data-address-combination 226 by reversing the function using the master-encoded address 106, thereby forming the reconstructed data 102r.

The method may further include encoding, e.g. using the data redundancy generating circuit 140, the reconstructed data 102r to form the master-encoded data 336.

The method of processing data may further include comparing the slave-encoded data 224 and the master-encoded data 336 with each other, which are supposed to be identical in a case of the data 102 retrieved from the slave 200 and the address 104 provided to the slave 200 being uncompromised.

The first code and the second (or fifth) code (for generating the address redundancy and the data redundancy, respectively) may be different codes with different code properties. In such a case, it may be possible to differentiate an attack on the address from an attack on the data from particularities in how the integrity check fails.

In various embodiments, the first code and the second code (or the fifth code, respectively) may be similar or identical.

In various embodiments, the first code and/or the second code and/or the third code and/or the fourth code and/or the fifth code may be a block code, or the like. In various embodiments, the first code and/or the second code and/or the third code and/or the fourth code and/or the fifth code may be a linear code, e.g. a Hamming code, or a cyclic code.

A hamming distance of the first code may be smaller than, larger than, or of the same size as a hamming distance of the second code.

A number of bits of the first code may be smaller than or equal to a number of bits of the data 102.

In various embodiments, the method may further include, in a case of the comparing the master-encoded data 336 to the slave-encoded data 224 resulting in a mismatch, triggering (in other words, raising) an alarm. The alarm may be triggered/raised irrespective of whether the integrity check is executed in the master 100, the slave 200, or both.

An alarm in this context may be understood as referring to an indication of an undesired situation, e.g. a situation that may require an action. The required action may be an automatic action and/or a manual intervention. The alarm may for example be configured to trigger a reset, to delete data or to simply issue a message. A nature of the alarm and/or an action triggered by it may be configurable by a user.

The integrity check may, alternatively or in addition to the integrity check in the master 100, be performed in the slave 200, for example using the further integrity check circuit 362

In various embodiments, the method of processing data may further include applying a code, e.g. the second code, to the data 102, thereby forming the slave-encoded data 224 as a first input to the further integrity check circuit 362. For this, the data redundancy generating circuit 342 may be used.

The method of processing data may further include generating, using the data redundancy generating circuit 140 in the master 100, master-encoded data 336 as a second input to the further integrity check circuit 362. In contrast to what is shown in FIG. 3B, the data redundancy generating circuit 140 may in this case be configured to apply the code (e.g. the second code) to the reconstructed data 102r that were retrieved from the slave 200, thereby forming the master-encoded data 336, which may therefore also be referred to as master-encoded reconstructed data 336.

Furthermore, the master 100 may send the master-encoded data 336 from the master 100 to the slave 200, for example via the one or more input/output ports 118 being part of the interface 333.

The verifying the integrity of the stored data 102 and of the address 104 may further include comparing the master encoded data 336 to the slave-encoded data 224 in the slave 200, e.g. using the further integrity check circuit 362, as for example shown in FIG. 3B. In other words, the slave module 200 may check/verify whether the master-encoded data 336 fits to the data 102, for example by comparing the master-encoded data 336 with the slave-encoded data 224.

In various embodiments, in a case of the data 102 and the address 104 being uncompromised, the master-encoded address 106 and the slave-encoded address 220 may be identical, and the master-encoded reconstructed data 336 and the slave-encoded data 224 may be identical.

The slave 200 may be configured to trigger an alarm in a case of the comparison of the master-encoded data 336 to the slave-encoded data 224 resulting in a mismatch, which may be indicative of a compromised address 104 and/or compromised data 102.

In various embodiments, the method of sending data may further include, in a case of the comparing the master-encoded data 336 to the slave-encoded stored data 224 using the integrity check circuit 362 resulting in a mismatch, triggering (in other words, raising) an alarm.

In various embodiments, instead of the single slave 200, a plurality of slaves 200 may be provided, and/or, instead of the single master 100, a plurality of masters 100 may be provided.

In a case of the plurality of slaves 200 being provided (not shown), the master-slave-system 300, 300a may in various embodiments include the slave 200 with the data sink 222 and at least one further slave including at least one further data sink having a further address, and a yet further processor or logic circuitry. The master-slave-system 300, 300a may be configured to execute the method of sending data, and the yet further processor or logic circuitry of the slave 200 may be configured to perform the same or a similar functionality as the processor 442 of the slave 200.

For example, the yet further processor or logic circuitry may be configured to receive a further address of a further data sink from the master, to read data from the further addressed data sink, to apply a sixth code to the further address, thereby forming a slave-encoded further address, to combine the further read data with the slave-encoded further address using the reversible function, thereby forming a further-data-address-combination, and to send the further-data-address-combination to the master.

In a case of the plurality of masters 100 being provided (not shown), the master-slave-system 300 may include the master 100 and at least one further master. The at least one further master may include yet another further processor configured to apply the first code to the address of the addressed data sink, to combine the data with the master-encoded address, to apply the second code to the data, to extract the data from the data-address-combination, and/or to compare the master-encoded data to the slave-encoded data.

In a case of pluralities of both masters and slaves being provided, a coupling of the plurality of masters and the plurality of slaves may in various embodiments be matrix-like, in other words, every master may be coupled to every slave.

In various embodiments, each master may be coupled to only a subset, i.e. one or more, of the slaves.

In various embodiments, each slave may be coupled to only a subset, i.e. one or more, of the masters.

Various examples will be illustrated in the following:

Example 1 is a method of sending data. The method may include, executed in a master, applying a first code to an address of an addressed data sink of a slave, thereby forming a master-encoded address, combining the data with the master-encoded address using a reversible function, thereby forming a data-address-combination, and sending the data-address-combination and the address from the master to the slave.

In Example 2, the subject-matter of Example 1 may optionally include that the method further includes, executed in the slave, applying the first code to the address received from the master, thereby forming a slave-encoded address, reconstructing the data from the data-address-combination by reversing the reversible function using the slave-encoded address, and storing the reconstructed data in the addressed data sink.

In Example 3, the subject matter of any one of Examples 1 or 2 may optionally include that the first code is a block code.

In Example 4, the subject matter of any one of Examples 1 to 3 may optionally include that the first code is a linear code.

In Example 5, the subject matter of any one of Examples 1 to 4 may optionally include that the first code is a hamming code or a cyclic code.

In Example 6, the subject matter of any one of Examples 1 to 5 may optionally include that the method further includes, executed in the master, applying a second code to the data, thereby forming master-encoded data, and sending the master-encoded data from the master to the slave.

In Example 7, the subject matter of Example 6 may optionally include that the method further includes, executed in the slave, receiving the master-encoded data from the master, and verifying an integrity of the stored data. The verifying may include applying the second code to the reconstructed data, thereby forming slave-encoded data, and comparing the master-encoded data with the slave-encoded data.

In Example 8, the subject matter of Example 7 may optionally include that the method further includes, in a case of the comparing the master-encoded data with the slave-encoded data resulting in a mismatch, triggering an alarm.

In Example 9, the subject matter of any one of Examples 6 to 8 may optionally include that the second code is a block code.

In Example 10, the subject matter of any one of Examples 6 to 9 may optionally include that the second code is a linear code.

In Example 11, the subject matter of any one of Examples 6 to 10 may optionally include that the second code is a hamming code or a cyclic code.

In Example 12, the subject matter of any one of Examples 2 to 11 may optionally include that the method further includes, executed in the slave, applying a third code to the stored data, thereby forming slave-encoded stored data, and sending the slave-encoded stored data from the slave to the master.

In Example 13, the subject matter of Example 12 may optionally include that the method further includes, executed in the master, receiving the slave-encoded stored data from the slave, and verifying an integrity of the stored data. The verifying may include applying the third code to the data, thereby forming master-encoded data, and comparing the master-encoded data to the slave-encoded stored data.

In Example 14, the subject matter of any one of Examples 3 to 13 may optionally include that the sending the data-address-combination and the sending the master-encoded data from the master to the slave are executed sequentially.

In Example 15, the subject matter of any one of Examples 12 to 14 may optionally include that the third code is a block code.

In Example 16, the subject matter of any one of Examples 12 to 15 may optionally include that the third code is a linear code.

In Example 17, the subject matter of any one of Examples 12 to 16 may optionally include that the third code is a hamming code or a cyclic code.

In Example 18, the subject matter of any one of Examples 1 to 17 may optionally include that the sending the data-address-combination and/or the address includes sending the data-address-combination and/or the address via a parallel interface.

In Example 19, the subject matter of any one of Examples 1 to 18 may optionally include that the sending the data-address-combination and the sending the master-encoded data from the master to the slave are executed sequentially.

Example 20 is a method of processing data from a data sink. The method may include, executed in a slave, receiving an address of the data sink from a master, reading data from the addressed data sink, applying a fourth code to the address, thereby forming a slave-encoded address, combining the read data with the slave-encoded address using a reversible function, thereby forming a data-address-combination, and sending the data-address-combination to the master.

In Example 21, the subject matter of Example 20 may optionally include that the fourth code is a block code.

In Example 22, the subject matter of any one of Examples 20 or 21 may optionally include that the fourth code is a linear code.

In Example 23, the subject matter of any one of Examples 20 to 22 may optionally include that the fourth code is a hamming code or a cyclic code.

In Example 24, the subject matter of any one of Examples 20 to 23 may optionally include that the method further includes, executed in the slave, applying a fifth code to the read data, thereby forming slave-encoded data, and sending the slave-encoded data to the master. The method may further include, executed in the master, receiving the data-address-combination and the slave-encoded data from the slave, applying the fourth code to the address, thereby forming a master-encoded address, reconstructing the data from the received data-address-combination by reversing the function using the master-encoded address, thereby forming reconstructed data, and comparing the reconstructed data with the slave-encoded data.

In Example 25, the subject matter of Example 24 may optionally include that the method further includes, executed in the master, applying the fifth code to the reconstructed data, thereby forming master-encoded data. Comparing the reconstructed data with the slave-encoded data may include comparing the master-encoded data with the slave-encoded data.

In Example 26, the subject matter of Example 24 may optionally include that the method further includes, executed in the master, applying the fifth code to the reconstructed data, thereby forming master-encoded data, and sending the master-encoded data to the slave.

In Example 27, the subject matter of Example 26 may optionally include that the method further includes, executed in the slave, receiving the master-encoded data from the master, and comparing the master-encoded data to the slave-encoded data.

In Example 28, the subject matter of any one of Examples 26 or 27 may optionally include that the method further includes in a case of the comparing the master-encoded data to the slave-encoded data resulting in a mismatch, triggering an alarm.

In Example 29, the subject matter of any one of Examples 24 to 28 may optionally include that the fifth code is a block code.

In Example 30, the subject matter of any one of Examples 24 to 29 may optionally include that the fifth code is a linear code.

In Example 31, the subject matter of any one of Examples 24 to 30 may optionally include that the fifth code is a hamming code or a cyclic code.

In Example 32, the subject matter of any one of Examples 1 to 31 may optionally include that the reversible function is a linear function.

In Example 33, the subject matter of any one of Examples 1 to 32 may optionally include that the reversible function is an XOR function.

In Example 34, the subject matter of any one of Examples 1 to 32 may optionally include that a number of bits of the first code is smaller than or equal to a number of bits of the data.

In Example 35, the subject matter of any one of Examples 1 to 34 may optionally include that the sending the data-address-combination includes sending the data-address-combination via a parallel interface.

In Example 36, the subject matter of any one of Examples 24 to 34 may optionally include that the sending the data-address-combination and the sending the slave-encoded data from the slave to the master are executed sequentially.

Example 37 is a master. The master may include a data source configured to provide data, at least one processor configured to apply a first code to an address of an addressed data sink, thereby forming a master-encoded address, combine the data with the master-encoded address using a reversible function, thereby forming a data-address-combination, and send the data-address-combination and the address from the master to a slave.

In Example 38, the subject matter of Example 37 may optionally include that the first code is a block code.

In Example 39, the subject matter of any one of Examples 37 or 38 may optionally include that the first code is a linear code.

In Example 40, the subject matter of any one of Examples 37 to 39 may optionally include that the first code is a hamming code or a cyclic code.

In Example 41, the subject matter of any one of Examples 37 to 40 may optionally include that the at least one processor is further configured to apply a second code to the data, thereby forming master-encoded data, and send the master-encoded data from the master to the slave.

In Example 42, the subject matter of Example 41 may optionally include that the second code is a block code.

In Example 43, the subject matter of any one of Examples 41 or 42 may optionally include that the second code is a linear code.

In Example 44, the subject matter of any one of Examples 41 to 43 may optionally include that the second code is a hamming code or a cyclic code.

In Example 45, the subject matter of any one of Examples 37 to 44 may optionally include that the at least one processor is further configured to send the data-address-combination and the master-encoded data to the slave via a serial interface.

In Example 46, the subject matter of any one of Examples 37 to 44 may optionally include that the at least one processor is further configured to send the data-address-combination and/or send the data-address-combination and/or the address via a parallel interface.

In Example 47, the subject matter of any one of Examples 37 to 46 may optionally include that the reversible function is a linear function.

In Example 48, the subject matter of any one of Examples 37 to 47 may optionally include that the reversible function is an XOR function.

In Example 49, the subject matter of any one of Examples 37 to 48 may optionally include that a number of bits of the first code is smaller than or equal to a number of bits of the data.

Example 50 is a master-slave-system. The master-slave-system may include a master according to any one of Examples 37 to 49. The master-slave-system may further include a slave. The slave may include at least one or more processors configured to apply the first code to the address received from the master, thereby forming a slave-encoded address, reconstruct the data from the data-address-combination by reversing the reversible function using the slave-encoded address, and a data sink configured to store the reconstructed data. The master-slave-system may further include an interface connecting the slave to the master.

In Example 51, the subject matter of Example 50 may optionally include that the at least one processor of the slave is further configured to receive the master-encoded data from the master, and verify an integrity of the stored data. The verifying may include applying the second code to the reconstructed data, thereby forming slave-encoded data, and comparing the master-encoded data with the slave-encoded data.

In Example 52, the subject matter of Example 51 may optionally include that the at least one processor of the slave is further configured to, in a case of the comparing the master-encoded data with the slave-encoded data resulting in a mismatch, trigger an alarm.

In Example 53, the subject matter of any one of Examples 50 to 52 may optionally include that the at least one processor of the slave is further configured to apply a third code to the stored data, thereby forming slave-encoded stored data, and send the slave-encoded stored data from the slave to the master.

In Example 54, the subject matter of Example 52 may optionally include that the at least one processor of the master is further configured to receive the slave-encoded stored data from the slave, and verify an integrity of the stored data. The verifying may include applying the third code to the data, thereby forming master-encoded data, and comparing the master-encoded data to the slave-encoded stored data.

In Example 55, the subject matter of any one of Examples 50 to 54 may optionally include that the interface is a serial interface.

In Example 56, the subject matter of any one of Examples 50 to 54 may optionally include that the interface is a parallel interface.

In Example 57, the subject matter of any one of Examples 53 to 56 may optionally include that the third code is a linear code.

In Example 58, the subject matter of any one of Examples 53 to 57 may optionally include that the third code is a hamming code or a cyclic code.

Example 59 is a slave. The slave may include at least one processor configured to receive an address of a data sink from a master, read data from the addressed data sink, apply a fourth code to the address, thereby forming a slave-encoded address, combine the read data with the slave-encoded address using a reversible function, thereby forming a data-address-combination, and send the data-address-combination to the master.

In Example 60, the subject matter of Example 59 may optionally include that the fourth code is a block code.

In Example 61, the subject matter of any one of Examples 59 or 60 may optionally include that the fourth code is a linear code.

In Example 62, the subject matter of any one of Examples 59 to 61 may optionally include that the fourth code is a hamming code or a cyclic code.

In Example 63, the subject matter of any one of Examples 59 to 62 may optionally include that the at least one processor is further configured to apply a fifth code to the read data, thereby forming slave-encoded data, and send the slave-encoded data to a master.

In Example 64, the subject matter of any one of Examples 59 to 63 may optionally include that the reversible function is a linear function.

In Example 65, the subject matter of any one of Examples 59 to 64 may optionally include that the reversible function is an XOR function.

In Example 66, the subject matter of any one of Examples 59 to 65 may optionally include that a number of bits of the first code is smaller than or equal to a number of bits of the data.

Example 67 is a master-slave-system, optionally a master-slave-system of any one of Examples 50 to 58. The master-slave-system may include a slave of any one of Examples 59 to 66. The master-slave-system may further include a master. The master may include at least one processor configured to receive the data-address-combination and the slave-encoded data from the slave, apply the fourth code to the address, thereby forming a master-encoded address, reconstruct the data from the received data-address-combination by reversing the function using the master-encoded address, thereby forming reconstructed data, and compare the reconstructed data with the slave-encoded data. The master-slave-system may further include an interface connecting the slave to the master.

In Example 68, the subject matter of Example 67 may optionally include that the at least one processor is further configured to apply a fifth code to the read data, thereby forming slave-encoded data, and send the slave-encoded data to a master. The at least one processor of the master is further configured to apply the fifth code to the reconstructed data, thereby forming master-encoded data. Comparing the reconstructed data with the slave-encoded data may include comparing the master-encoded data with the slave-encoded data.

In Example 69, the subject matter of Example 67 may optionally include that the at least one processor of the master is further configured to apply the fifth code to the reconstructed data, thereby forming master-encoded data, and send the master-encoded data to the slave.

In Example 70, the subject matter of 69 may optionally include that the at least one processor of the slave is further configured to receive the master-encoded data from the master, and compare the master-encoded data to the slave-encoded data.

In Example 71, the subject matter of any one of Examples 69 or 70 may optionally include that the at least one processor of the slave is further configured to, in a case of the comparing the master-encoded data to the slave-encoded data resulting in a mismatch, trigger an alarm.

In Example 72, the subject matter of any one of Examples 68 to 71 may optionally include that the fifth code is a block code.

In Example 73, the subject matter of any one of Examples 68 to 72 may optionally include that the fifth code is a linear code.

In Example 74, the subject matter of any one of Examples 68 to 73 may optionally include that the fifth code is a hamming code or a cyclic code.

In Example 75, the subject matter of any one of Examples 68 to 74 may optionally include that the interface is a serial interface.

In Example 76, the subject matter of any one of Examples 68 to 74 may optionally include that the interface is a parallel interface.

Various aspects of the disclosure are provided for devices, and various aspects of the disclosure are provided for methods. It will be understood that basic properties of the devices also hold for the methods and vice versa. Therefore, for sake of brevity, duplicate description of such properties may have been omitted.

What is claimed is:

1. A method of sending data, the method comprising:
   in a master:
   applying a first code to an address of an addressed data sink of a slave, thereby forming a master-encoded address;
   combining the data with the master-encoded address using a reversible function, thereby forming a data-address-combination;
   sending the data-address-combination and the address from the master to the slave;
   applying a second code to the data, thereby forming master-encoded data; and
   sending the master-encoded data from the master to the slave.

2. The method of claim 1, further comprising:
   in the slave:
   applying the first code to the address received from the master, thereby forming a slave-encoded address;
   reconstructing the data from the data-address-combination by reversing the reversible function using the slave-encoded address; and
   storing the reconstructed data in the addressed data sink.

3. The method of claim 1, further comprising:
   in the slave:
   receiving the master-encoded data from the master;
   verifying an integrity of the stored data, comprising:
   applying the second code to the reconstructed data, thereby forming slave-encoded data; and
   comparing the master-encoded data with the slave-encoded data.

4. The method of claim 2, further comprising:
   in the slave:
   applying a third code to the stored data, thereby forming slave-encoded stored data; and
   sending the slave-encoded stored data from the slave to the master.

5. The method of claim 4, further comprising:
   in the master:
   receiving the slave-encoded stored data from the slave;
   verifying an integrity of the stored data, comprising:
   applying the third code to the data, thereby forming master-encoded data; and
   comparing the master-encoded data to the slave-encoded stored data.

6. A method of processing data from a data sink, the method comprising:
   in a slave:
   receiving an address of the data sink from a master;
   reading data from the addressed data sink;
   applying a fourth code to the address, thereby forming a slave-encoded address;
   combining the read data with the slave-encoded address using a reversible function, thereby forming a data-address-combination;
   sending the data-address-combination to the master;
   applying a fifth code to the read data, thereby forming slave-encoded data; and
   sending the slave-encoded data to the master; and
   in the master:
   receiving the data-address-combination and the slave-encoded data from the slave;
   applying the fourth code to the address, thereby forming a master-encoded address; and
   reconstructing the data from the received data-address-combination by reversing the function using the master-encoded address, thereby forming reconstructed data.

7. The method of claim 6, further comprising:
   in the master:
   applying the fifth code to the reconstructed data, thereby forming master-encoded data; and
   comparing the master-encoded data with the slave-encoded data.

8. The method of claim 6, further comprising:
   in the master:
   applying the fifth code to the reconstructed data, thereby forming master-encoded data; and
   sending the master-encoded data to the slave.

9. The method of claim 6,
wherein the reversible function is a linear function.

10. A master, comprising:
a data source configured to provide data;
at least one processor configured to
   apply a first code to an address of an addressed data sink, thereby forming a master-encoded address;
   combine the data with the master-encoded address using a reversible function, thereby forming a data-address-combination,
   send the data-address-combination and the address from the master to a slave;
   apply a second code to the data, thereby forming master-encoded data; and
   send the master-encoded data from the master to the slave.

11. The master of claim 10,
wherein the at least one processor is further configured to
   apply a second code to the data, thereby forming master-encoded data; and
   send the master-encoded data from the master to the slave.

12. The master of claim 10,
wherein the reversible function is a linear function.

13. The master of claim 10,
wherein a number of bits of the first code is smaller than or equal to a number of bits of the data.

14. A master-slave-system, comprising:
a master, comprising:
   a data source configured to provide data;
   at least one processor configured to
      apply a first code to an address of an addressed data sink, thereby forming a master-encoded address;
      combine the data with the master-encoded address using a reversible function, thereby forming a data-address-combination, and
      send the data-address-combination and the address from the master to a slave;
a slave, comprising:
   at least one or more processors configured to
      apply the first code to the address received from the master, thereby forming a slave-encoded address;
      reconstruct the data from the data-address-combination by reversing the reversible function using the slave-encoded address; and
   a data sink configured to store the reconstructed data; and
an interface connecting the slave to the master;
wherein the at least one processor of the slave is further configured to:
   receive the master-encoded data from the master;
   verify an integrity of the stored data, comprising:
      applying the second code to the reconstructed data, thereby forming slave-encoded data; and
      comparing the master-encoded data with the slave-encoded data.

15. The master-slave-system of claim 14,
wherein the at least one processor of the slave is further configured to
   apply a third code to the stored data, thereby forming slave-encoded stored data; and
   send the slave-encoded stored data from the slave to the master.

16. The master-slave-system of claim 15,
wherein the at least one processor of the master is further configured to
   receive the slave-encoded stored data from the slave;
   verify an integrity of the stored data, comprising:
      applying the third code to the data, thereby forming master-encoded data; and
      comparing the master-encoded data to the slave-encoded stored data.

17. A master-slave-system, comprising:
a slave, comprising:
   at least one processor configured to
      receive an address of a data sink from a master;
      read data from the addressed data sink;
      apply a fourth code to the address, thereby forming a slave-encoded address;
      combine the read data with the slave-encoded address using a reversible function, thereby forming a data-address-combination; and
      send the data-address-combination to the master;
a master, comprising:
   at least one processor configured to
      receive the data-address-combination from the slave;
      apply the fourth code to the address, thereby forming a master-encoded address;
      reconstruct the data from the received data-address-combination by reversing the function using the master-encoded address, thereby forming reconstructed data;
an interface connecting the slave to the master;
wherein the at least one processor of the slave is further configured to
   apply a fifth code to the read data, thereby forming slave-encoded data; and
   send the slave-encoded data to a master;
wherein the at least one processor of the master is further configured to apply the fifth code to the reconstructed data, thereby forming master-encoded data, and to compare the master-encoded data with the slave-encoded data.

18. The master-slave-system of claim 17,
wherein the at least one processor of the master is further configured to
   apply the fifth code to the reconstructed data, thereby forming master-encoded data; and
   send the master-encoded data to the slave.

19. The master-slave-system of claim 18,
wherein the at least one processor of the slave is further configured to apply the fifth code to the reconstructed data, thereby forming slave-encoded data, and to compare the master-encoded data with the slave-encoded data.

* * * * *